United States Patent [19]
Birchall et al.

[11] 3,785,845
[45] Jan. 15, 1974

[54] PRINTING PROCESS

[75] Inventors: James Derek Birchall, Norley; John Edward Cassidy, Hartford; John Stafford; Anthony Graham Marshall Last, both of Welwyn Garden City, all of England

[73] Assignee: Imperial Chemical Industries Limited, London, England

[22] Filed: Dec. 10, 1971

[21] Appl. No.: 206,909

[30] Foreign Application Priority Data
Dec. 11, 1970 Great Britain.................... 59010/70

[52] U.S. Cl........................ 117/15, 117/45, 117/62, 117/76 F
[51] Int. Cl........................... B41m 1/24, B44d 1/32
[58] Field of Search...................... 117/15, 45, 76 F; 423/305, 311

[56] References Cited
UNITED STATES PATENTS
3,111,418  11/1963  Gilbert.................................. 117/15
3,516,842  6/1970   Klinker.................................. 117/45
2,888,406  5/1959   Bondley............................. 252/516
2,909,451  10/1959  Lawler................................. 423/305

FOREIGN PATENTS OR APPLICATIONS
2,051,101  2/1971   France................................. 117/15

Primary Examiner—Ralph S. Kendall
Assistant Examiner—M. F. Esposito
Attorney—Cushman, Darby & Cushman

[57]  ABSTRACT

A process is provided for applying printed matter to plastic substrates by coating the substrate with a composition capable of generating aluminum phosphate. A complex aluminum phosphate having at least 1 chemically-bound molecule of an hydroxy compound ROH where R is hydrogen or an organic group is preferred. The coating is heated to provide at least a partially cured layer of aluminum phosphate and the inked pattern is applied thereto.

10 Claims, No Drawings

PRINTING PROCESS

This invention relates to organic plastics substrates such as films or sheets, in particular to a process for printing the surface of such substrates, and to substrates so printed.

For many applications of plastics films, for example when a film is used as a packaging material, it is desirable to imprint decorative or descriptive matter on to the film surface by means of suitable inks and dyes. Hitherto, one of the problems encountered in the printing of film surfaces has been the difficulty of ensuring adequate adhesion of the printed matter to the film surface to prevent peeling-off of the printed matter during subsequent usage of the film. To improve the adhesion between film surface and printed matter it has been necessary to subject the film surface to some form of treatment which will provide a suitable base to which the printed matter will key. Thus, the surface of a polyolefin film, for example, is etched by means of a suitable solvent prior to the application of printed matter thereto. Alternatively, the film surface may be conditioned by treatment with an oxidising agent such as chromic acid or a suitably conditioned surface may be obtained by subjecting the film surface to electron discharge treatment. These treatments are difficult to apply and are economically undesirable.

We have now found that the printability of a film or sheet is improved by providing on the surface of the film or sheet a coating of an aluminium phosphate.

Accordingly, the present invention provides a process for applying printed matter to an organic plastics substrate comprising applying to the substrate a coating of a composition capable of generating aluminium phosphate on heating, heating said coating to provide a cured or partially cured layer of aluminium phosphate and applying an inked pattern to said cured or partially cured layer of aluminium phosphate.

Within the term "substrate" we include unitary films, i.e., films fabricated from a single component, laminated films formed by bonding together a plurality of film layers of the same or different chemical composition, foamed films produced by incorporation of a suitable blowing agent into the film-forming melt, and polymeric sheets. The thickness of a film is conveniently expressed in terms of gauge, where 100 gauge indicates a thickness of 0.0254 mm, and films suitable for use in the process of the present invention vary in thickness from about 25 to about 1000 gauge. Substrates of thickness in excess of about 1000 gauge are herein referred to as sheets.

Suitable substrates include cellulose and preferably synthetic thermoplastics such as polyolefins, for example polymers and copolymers of ethylene, propylene, butadiene, isoprene, 4-methyl pentene-1 and styrene, copolymers of ethylene with unsaturated esters such as vinyl acetate or alkyl acrylates or methacrylates, modified polystyrene, for example a styrene-maleic anhydride copolymer, polymers and copolymers of other ethylenically unsaturated monomers such as vinyl chloride, vinylidene chloride, chloroprene, methyl methacrylate, ethyl acrylate and vinyl acetate, polyphenylene oxides and sulphides, polysulphones, polyoxymethylenes, polyamides such as polycaprolactam (Nylon 6), polyhexamethylene adipamide (Nylon 6—6) and polyundecanolactam (Nylon 11), and polycarbonates and polyesters such as polyethylene 1,2-diphenoxyethane-4,4'-dicarboxylate and polyethylene terephthalate.

Film substrates for use in the process of the present invention are employed in either an undrawn state, i.e., in the as cast condition, for example films of polyvinyl chloride or polystyrene, or in a drawn condition in which the tensile properties of the film are improved by stretching the film, at a temperature above the second order transition point of the polymeric film either uniaxially or biaxially in two mutually perpendicular directions in the plane of the film to orient the molecular structure of the film, and then heat setting the film at a temperature below its melting point while the film is held under tension. Typical examples of drawn film are polypropylene and polyethylene terephthalate films.

The composition capable of generating aluminium phosphate on heating can advantageously be a halogen-containing complex phosphate of aluminium containing at least one chemically-bound molecule of a hydroxy compound R-OH wherein R is a hydrogen atom or an organic group. Such materials are described and claimed in the complete specification of United Kingdom Patent Application 29862/69, which corresponds to U.S. application Ser. No. 42,499, now abandoned, now refiled as Ser. No. 274,964, the disclosure of which is incoporated herein by reference.

On heating these complex phosphates at relatively low temperatures, of the order of 80° C, to 180° C, they decompose evolving a hydrogen halide and the compound R-OH to form a hard abrasion-resistant aluminium phosphate. As used herein, the term "complex aluminium phosphate" denotes the material prior to decomposition by heating while the term "aluminium phosphate" denotes the product obtained by decomposing the complex aluminium phosphate by heating.

If the complex phosphate is applied as a solution in a suitable solvent, for example water, or an alcohol such as methanol or ethanol, to a substrate, on removing the solvent and heating to decompose the complex aluminium phosphate, the aluminium phosphate produced forms a strongly adherent coating on the substrate that is stable to high temperatures.

Preferably the halogen in the complex aluminium phosphate is chlorine. Also it is preferred that R is an aliphatic hydrocarbon or substituted hydrocarbon group; in particular it is preferred that the hydroxy compound is an aliphatic alcohol containing one to four carbon atoms, particularly methanol or ehtanol. The ratio of the number of gram atoms of aluminium to the number of gram atoms of phosophorus in the complex phosphates of aluminium may vary over a wide range, for example from 1:2 to 2:1, but is preferably substantially 1:1, as complex phosphates of the invention having this ratio decompose at low temperatures directly to form aluminium orthophosphate having greater chemical stability and refractoriness than aluminium phosphate formed from complex phosphates with other ratios. As a typical example the complex aluminium phosphate has an empirical formula $AlPClH_{25}C_8O_8$ which can be designated aluminium chlorophosphate ethanolate, although it must be understood that this designation in no way implies any particular molecular structure for the compound.

In another method of preparing a suitable coating composition capable of yielding an aluminium phosphate on heating, aluminium phosphate is dissolved or dispersed in hydrochloric, sulphuric, oxalic or citric acid or a compatible mixture of two or more such acids. Aluminium orthophosphate, for example may be used with hydrochloric acid at molar ratios varying between 1:0.1 and 1:10, preferably between 1:0.25 and 1:10. Solutions obtained may optionally be diluted with water and/or an alcohol, for example methanol or ethanol, before use as a coating composition. It is preferred to dilute the solutions, if required, immediately before use because the dissolved phosphates are prone to precipitate from dilute solutions on prolonged storage.

A solution of aluminium phosphate in hydrochloric acid may be for the purposes of this invention made by dissolving aluminium chloride in phosphoric acid.

Inks for use in printing polymeric substrates are often doped with adhesion-promoting additives to improve the bond between the substrate and the inked pattern printed thereon. Thus, inks for use in the printing of polyolefinic substrates are usually doped with polyamides as adhesion promoters. However, the process of the present invention enables a wide range of conventional printing inks to be employed and any of the commercially available inks may be used, for example inks having aqueous or alcoholic or ketonic bases, or inks based on polyacrylates or other polymeric vehicles.

The aluminium phosphate coatings of this invention are applied either to one or to both faces of the polymeric film or sheet substrate and the coatings may be continuous, extending over the entire surface, or discontinuous in so far as a coating is deposited only on those portions of the film surface to which printed matter is to be applied.

The coatings are most conveniently derived from a solution of the complex phosphate in aqueous or organic solvent and in the latter case we prefer that the organic solution should be applied under essentially anhydrous conditions. The organic solvent is preferably a polar solvent, especially an oxygen-containing polar solvent. Especially useful are aliphatic alcohols containing up to ten carbon atoms, esters, polyhydric alcohols, and glycol esters. Most preferred are aliphatic alcohols containing from one to five carbon atoms, for example methanol or ethanol. The solvent may be a mixture of solvents, for example a methanol/chloroform mixture. It is especially preferred that the solution of complex phosphate comprises a material or materials which control the physical nature of the solid phase of aluminium phosphate which is produced from the solution, for example by heating. When the solvent comprises water it is preferred to use a crystallisation stabiliser, for example finely divided silica or alumina, or a nucleation activator or catalyst, for example dibutyl peroxide, or calcium, magnesium or sodium chloride. When the solution of the complex phosphate is non-aqueous, for example when the solvent is ethanol, it is preferred to use a boric acid ester or ether or a silicic acid ester or ether, for example methyl borate, trimethoxy boroxine or ethyl silicate to suppress the crystallisation of aluminium phosphate.

Application of the coating composition to the polymeric substrate is achieved by any of the conventional coating techniques, for example by spraying a solution of the coating composition on to the surface of the substrate or by immersing the substrate in a bath of the coating solution. In the case of a film substrate, coating of both surfaces of the film is conveniently achieved by reeling a continuous film strip through a bath of the coating solution. Coating of one side of a film is readily achieved by employment of a triple-roll system of the type employed in lithographic printing process. In the latter coating process film strip is passed through the nip between a pair of contra-rotating cylindrical rolls, viz a coating roll and a backing roll. Coating solution is applied to the coating roll, and thence to a film, by means of a transfer roll which rotates in surface contact with the coating roll and which picks up coating solution from a solution reservoir, for example either by partial immersion of the transfer roll in the reservoir or by means of a multiple-roll train interposed between the reservoir and the transfer roll, or by any other convenient method.

As hereinbefore described, the coatings may be discontinuous, being deposited only on those portions of the substrate to which printed matter is to be applied. In the case of coatings applied by a spraying process, discontinuous coating is conveniently achieved by employing a suitable masking technique, whereas for coatings applied by a roller system a discontinuous coating is most conveniently achieved by means of a transfer roll which is suitably profiled to deposit the desired pattern of coating solution on to the coating roll and thence on to the film substrate.

The coating of phosphate solution deposited on the substrate is cured by heating, which serves both to remove solvent and to generate a strongly adherent layer of aluminium phosphate on the substrate. Heating of the phosphate coating is effected by any convenient means, for example by passage of the coated substrate through an air oven maintained at the requisite temperature. Alternatively, when the substrate is incapable of withstanding the curing temperature, the coating is heated by a method which does not heat the substrate, for example by micro-wave heating. The duration of heating is preferably at least ten minutes. The form of aluminium phosphate produced will depend, amongst other things, upon the temperature to which the coating is heated. Although in the case of the complex phosphate a temperature of at least 80° C is normally sufficient to form a coat of aluminium phosphate, the coating is preferably heated to a temperature in excess of 100° C.

The required pattern or other printed matter is applied to the cured phosphate coating by any suitable printing technique, for example by rotary letter-press, flexographic, lithographic or photogravure processes.

The thickness of the cured aluminium phosphate layer is conveniently between about 0.1 to 20 microns, and preferably less than 10 microns, but when the coating is required to exhibit transparency we prefer to maintain the thickness of the cured coating below about 2.5 to 3 microns. Coatings of thickness greater than about 3 microns tend to become powdery and opaque but are preferably suitable as a base on which to apply printed matter, provided that transparency of the coating is not essential.

Organic materials, preferably polymers, may be dissolved in the solutions from which the coatings of this invention are produced to give coatings comprising an organic material and aluminium phosphate. It is advantageous to add a suitable wetting agent, e.g. a perfluoro surfactant, to the coating solution to assist uniform coating. Other components, for example pigments, may be incorporated in the coating by including them in the coating solution.

Although the coatings of this invention are intended for application directly on to untreated polymeric substrates, our invention does not preclude the prior treatment of the substrate, for example by electron discharge treatment, to promote adhesion of the coating to the substrate. In addition or alternatively, fillers such as finely divided silica, silicates or calcium carbonate may be incorporated into either or both the polymeric substrate and the applied coating layer to promote adhesion therebetween.

Our invention also provides an organic plastics substrate coating with a layer of aluminium phosphate, said layer being overprinted with an inked pattern.

If desired, the printed products of this invention may be overcoated with a second coating of aluminium phosphate by the techniques herein described, to provide an abrasion-resistant, protective layer over the printed matter.

The products of this invention are particularly suitable for use in the packaging industry, for example in the packaging of foodstuffs, garments or other articles where a printed package is desired, and are also suitable for the production of decorative wall-coverings and the like.

The invention is illustrated by the following Example in which all parts and percentages are by weight:

EXAMPLE

A solution was prepared by dissolving 10 g of the aluminium chlorophosphate ethanolate prepared as described in Example 1 in U.K. Patent Application No. 29862/69 and 0.5 g of polyvinylpyrrolidone in 90 g of methanol. This solution was used to coat polyethylene terephthalate film by dipping a piece of the film in a beaker of the solution and withdrawing the film at a rate of nine inches per miniute. The dipping process was carried out inside a nitrogen-purged box in which the relative humidity was less than 10 percent. The solution wetted the surface of the polyester film with a continuous layer and after drying the coated film at ambient temperature in the nitrogen-purged box the coated film was removed from the box and the aluminium chlorophosphate ethanolate coating containing some polyvinylpyrrolidone was cured by placing the coated film in an oven at a temperature of 120° C for thirty minutes. This process gave a continuous strongly adherent mixed coating of aluminium phosphate containing 13 percent w/w polyvinylpyrrolidone on the surface of the polyester film.

A coating of Coates Solar Red, a modified nitrocellulose ink, was applied to the phosphate-treated surface of the polyester and allowed to dry. The adhesion of the ink to the surface was tested by consecutively sticking three strips of one-inch wide transparent adhesive tape to the printed surface and immediately peeling the strips off keeping the tape at an angle of about 140° C to the film surface. After three pulls with fresh adhesive tape only 5 percent of the ink had been pulled from the surface.

We claim:

1. A process for applying printed matter to an organic plastics substrate comprising applying to the substrate a coating of a composition capable of generating aluminium phosphate and containing a complex of aluminium having at least one molecule of a hydroxy compound ROH wherein R is a hydrogen atom or an organic group, heating said coating to provide a cured or partially cured layer of aluminium phosphate and applying an inked pattern to said cured or partially cured layer of aluminium phosphate.

2. A process as claimed in claim 1 wherein the substrate comprises cellulose, polyolefins, copolymers of ethylene with unsaturated esters, modified polystyrene, polymers and copolymers of vinyl chloride, vinylidene chloride, chloroprene, methyl methacrylate, ethyl acrylate and vinyl acetate, polyphenylene oxides and sulphides, polysulphones, polyoxymethylenes, polyamides, polycarbonates and polyesters.

3. A process as claimed in claim 1 wherein the coating composition comprises a halogen-containing complex of aluminium containing at least one chemically-bound molecule of a hydroxy compound ROH wherein R is a hydrogen atom or an organic group.

4. A process as claimed in claim 3 wherein the hydroxy compound is the halogen-containing complex phosphate of aluminium is an aliphatic alcohol containing one to ten carbon atoms.

5. A process as claimed in claim 4 wherein the hydroxy compound is ethanol.

6. A process as claimed in claim 3 wherein the complex phosphate of aluminium contains chlorine.

7. A process as claimed in claim 3 wherein the complex phosphate of aluminium has the empirical formula $AlPHlH_{25}C_8O_8$.

8. A process as claimed in claim 3 wherein the coating composition comprises the halogen-containing complex of aluminium dissolved in an organic solvent.

9. A process as claimed in claim 8 wherein the solvent is methanol.

10. A process as claimed in claim 3 wherein the curing of the coating is effected at a temperature of at least 80° C.

* * * * *